United States Patent Office 3,489,752
Patented Jan. 13, 1970

---

3,489,752
7-AMINO-CEPHALOSPORANIC AND DECEPHALO-SPORANIC ACID DERIVATIVES
Leonard Bruce Crast, Jr., North Syracuse, N.Y., assignor to Bristol-Myers Company, New York, N.Y., a corporation of Delaware
No Drawing. Filed Sept. 5, 1967, Ser. No. 665,256
Int. Cl. C07d 99/24; A61k 21/00
U.S. Cl. 260—243          13 Claims

ABSTRACT OF THE DISCLOSURE

7[D - (—) - α-amino-α-(p-hydroxyphenyl)-acetamido]-cephalosporanic acid and 7-D-(—)-2,2-dimethyl-4-(p-hydroxyphenyl) - 5 - oxo - 1-imidazolidinyl]cephalosporanic acid and the corresponding decephalosporanic acids and the salts thereof are new synthetic compounds of value as antibacterial agents and in the treatment of bacterial infections.

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and gram-negative bacteria.

Description of the prior art

There exists a need to provide alternative and improved agents for the treatment of infections caused by gram-positive and gram-negative bacteria, particularly for the treatment of infections caused by resistant strains of bacteria, e.g. benzylpenicillin-resistant strains of *Staphylococcus aureus* (*Micrococcus pyogenes* var. *aureus*), or for the decontamination of objects bearing such organisms, e.g. hospital equipment, walls of operating rooms and the like. Of particular need are antibacterial agents which exhibit good oral absorption in animals.

The compounds of this invention are D-(—)-7-[α-(p-hydroxyphenyl)-α-aminoacetamido]cephalosporanic

SUMMARY OF THE INVENTION

The compounds of this invention at 7-[D-(—)-α-amino-α - (p - hydroxyphenyl)-acetamido]cephalosporanic acid having the formula

I

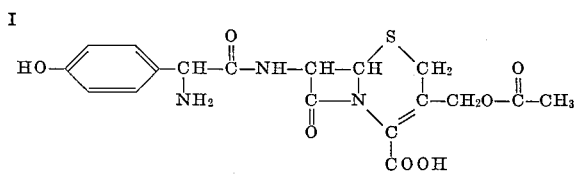

7 - [D - (—)-α-amino-α-(p-hydroxyphenyl)-acetamido]-decephalosporanic acid also named 7-[D-(—)-α-amino-α - (p-hydroxyphenyl)-acetamido]-3-methyl-3-cephem-5-carboxylic acid having the formula

II

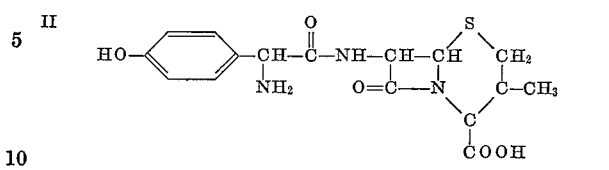

7 - [D - (—) - 2,2-dimethyl-4-(p-hydroxyphenyl)-5-oxo-1 imidazolidinyl]-cephalosporanic acid having the formula

III

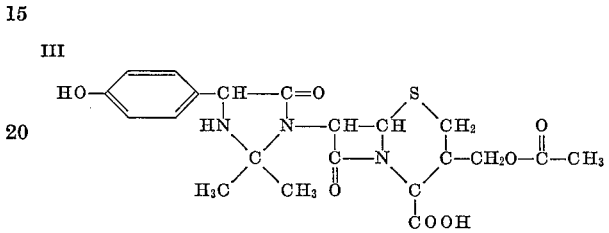

and 7-[D-(—)-2,2-dimethyl-4-(p-hydroxyphenyl)-5-oxo-1 imidazolidinyl]-decephalosporanic acid also named 7-[D-(—) - 2,2 - dimethyl-4-(p-hydroxyphenyl)-5-oxo-1-imidazolidinyl]-3-methyl-3-cephem-5-carboxylic acid having the formula

IV

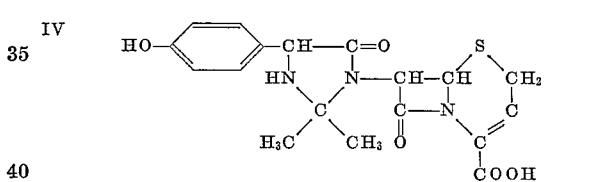

and the nontoxic pharmaceutically acceptable salts thereof.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri(lower) alkylamines, procaine, dibenzylamine, N - benzyl - beta-phenethylamine, 1-ephenamine, N,N'-dibenzylethylenediamine, dehydroabietylamine, N,N'-bisdehydroabiethylethylenediamine, N-(lower) alkylpiperidines, such as N-ethylpiperidine and other amines which have been used to form salts of benzylpenicillin; and (2) non-toxic pharmaceutically acceptable acid addition salts (i.e. salts of the basic nitrogen) such as (a) the mineral acid addition salts such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate p-toluenesulfonate and the like.

Also included are the easily hydrolyzed esters or amides of such acids which may be converted to the free acid form by chemical or enzymatic hydrolysis.

The compounds of Formula I and Formula II of the present invention are prepared in the form in which the α-amino group is blocked by the reaction of 7-aminocephalosporanic acid or 7-aminodecephalosporanic acid, described in U.S. Patent No. 3,268,523 (preferably in the form of a neutral salt such as the sodium salt or the triethylamine salt) with a mixed anhydride e.g. mixed anhydride obtained from reaction with ethyl chlorocarbonate, of an acid having the formula

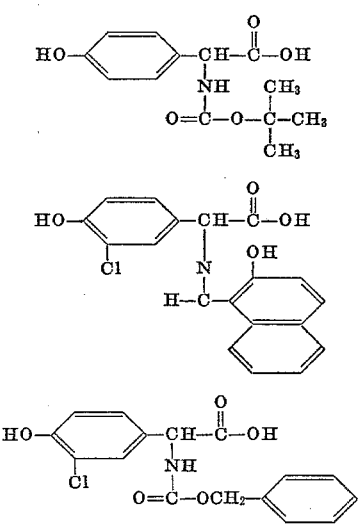

or the formula

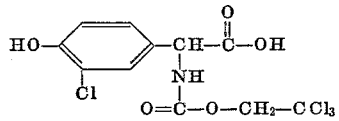

or with its functional equivalent as an acylating agent for a primary amino group. Such mixed anhydrides include particularly the mixed anhydrides prepared from stronger acids such as the lower aliphatic monoesters of carbonic acid, of alkyl and aryl sulfonic acids and of more hindered acids such as diphenylacetic acid. Such equivalents include the corresponding carboxylic chlorides, bromides and then acid anhydrides. In addition, an acid azide or an active ester or thioester (e.g. with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent [especially N,N'-dicyclohexylcarbodiimide, N,N'-diisopropylcarbodiimide or N - cyclohexyl - N' - (2 - morpholinoethyl) carbodiimide; cf. Sheehan and Hess, J. Amer. Chem. Soc. 77, 1967, 1955)], or of alkynylamine reagent [cf. R. Buijle and H. G. Viehe, Angew. Chem. International Editional Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'- carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126, and 3,129,224 and British Patents Nos. 932,644, 957,570 and 959,054).

The blocking group is then removed to form the products of the present invention, e.g. the t-butoxycarbonyl group is removed by treatment with formic acid, the carbobenzyloxy group is removed by catalytic hydrogenation the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

The compound of Formula II of this invention can also be prepared by hydrogenation of a compound of Formula I in the presence of a catalysis e.g. hydrogenation at 50 p.s.i. for about 3 hours in the presence of 5% palladium on barium sulfate.

The compounds of Formulas II and IV of the present invention are prepared by reaction of acetone with the corresponding cephalosporin of Formula I or II. Although some reaction will occur no matter what molar proportion of reactants is used, it is preferable in order to obtain maximum yields to use a molar excess of the acetone and the latter may well be used as the reaction solvent. Water is split off during the reaction and it is thus preferable not to have a major amount of water in the reaction medium. The pH of the reaction mixture should be from about 5 to 9 and preferably on the alkaline side. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction will proceed satisfactorily at room temperature and may be hastened by heating.

Thus the present invention includes the process of preparing the compound of the formula

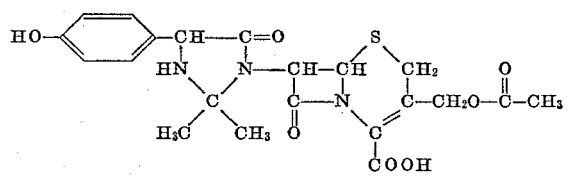

wherein R is hydrogen or acetoxy which comprises mixing a cephalosporin of Formula I or II with at least an equimolar weight of acetone in the absence of substantial amount of water at a pH in the range of 5 to 9 and at a temperature in the range of −20° C. to +50° C.

D-(−)-2-(p-hydroxyphenyl)-glycine used as a starting material for the preparation of the compounds of this invention is prepared according to the reaction scheme exemplified below.

Preparation of starting material

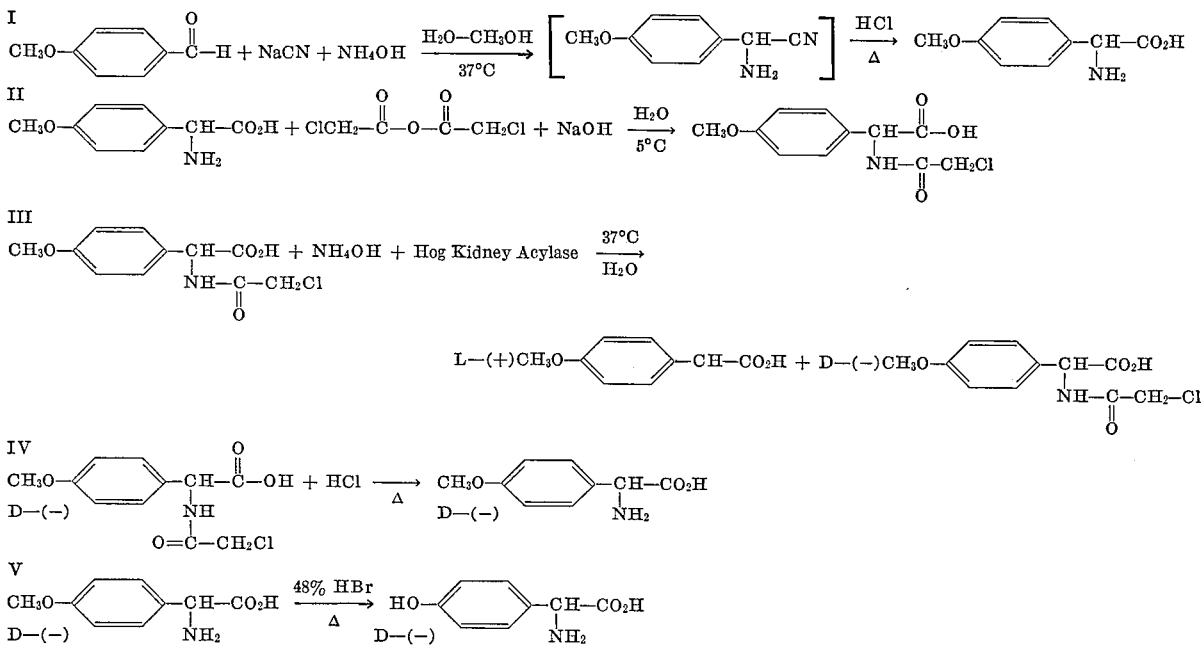

(I) dl - 2 - (p-methoxyphenyl)-glycine.—To a stirred solution of 19.6 g. (0.4 mole) of NaCN in 80 ml. of H₂O was added 23.6 g. (0.450 mole) of NH₄Cl and 20 ml. of conc. NH₄OH followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of H₂O and then 240 ml. of 6 N HCl added with good mixing and the MIBK was removed in vacuo. The resulting slurry was heated at reflux (now in solution) for two hours. One hundred ml. of H₂O was added to the hot solution and then 8 g. of decolorizing carbon added and after ten minutes at gentle reflux the carbon was filtered off and washed with 50 ml. of hot water. The combined filtrates (hot) were stirred and treated with conc. NH₄OH until pH 5–6 was obtained (pH paper). The slurry was then cooled to 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6 N HCl with cooling. After one hour the product was filtered off, washed with 3×100 ml. H₂O and air dried. Yield 40 g.; dec. 24° C. with sublimation at 230° C.

(II) dl - 2 - (p - methoxyphenyl)-N-(chloroacetyl)glycine.—To a stirred suspension of 36 g. (0.2 mole) of dl-2-(p-methoxyphenyl)-glycine in 500 ml. of H₂O was added 8 g. (0.2 mole) of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of H₂O was added over a 10 to 15 minute period. More 20% NaOH was added as needed to keep the pH at about 9 for a 1.5 hour period. Next, the pH was adjusted to 2 with 40% H₃PO₄. The product crystallized immediately and was filtered off, washed with water and recrystallized from ethanol-water to give 38 g. of product melting at 182°–183° C.

Analysis.—Calcd. for C₁₁H₁₂ClNO₄: C, 51.21; H, 4.69. Found: C, 51.49; H, 4.90.

(III) D-(−)-2-(p-methoxyphenyl) - N - (chloroacetyl)glycine and L-(+)-2-(p-methoxyphenyl)-glycine.—To 800 ml. of H₂O stirred at 37° C. was added 38 g. (0.148 mole) of dl-2-(p-methoxyphenyl)-N-(chloroacetyl)-glycine and NH₄OH added dropwise until pH 7.8 was obtained. To the resulting solution was added 2 g. of Hog Kidney Acylase (Sigma Chemical Company) and stirring continued at 37° C. (internal) for 21 hours. The solids containing crude L-(+)-2-(p-methoxyphenyl)-glycine were then filtered off and washed with 2×100 ml. H₂O and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% H₃PO₄. After one hour cooling at 0° C. the crystalline product was filtered off and washed with cold water (3×) and air dried. The yield was 16 g. D-(−)-2-(p-methoxyphenyl)-N-chloroacetyl)glycine and when a second run using 5× the above amounts were used a yield of 83 g. (87% yield) was obtained. M.P. 170°–171° C.;

$[\alpha]_D^{25°\ C.}$ −193° (c.=1%, ethanol)

Analysis.—Calcd. for C₁₁H₁₂ClNO₄: C, 51.21; H, 4.69. Found: C, 51.50; H, 4.99.

When the solids containing crude L-(+)-2-(p-methoxyphenyl)-glycine are treated with hot 3 N HCl (200 ml.) and carbon followed by filtration and pH adjustment to 5.5 there is obtained 6 g. (first run) of pure L-(−)-(p-methoxyphenyl)glycine.

$[\alpha]_D^{25°\ C.}$ +105.4° (c.=1%, 1 N HCl)

(IV) D-(−)-2-(p-methoxylphenyl)-glycine.—The 16 g. of D-(−)-2-(p-methoxyphenyl)-N-(chloroacetyl) glycine were refluxed 1.5 hours in 170 ml. of 2 N HCl. The resulting clear solution was filtered and cooled at 5° C. and the pH adjusted to 5.5 with NH₄OH. The product was then filtered off after cooling 30 min. and washed with 3× 25 ml. of cold water. The dried material D-(−)-2-(p-methoxyphenyl)-glycine weighed 9.5 g. A second run gave 54 g. using the 83 g. of starting material from III.

$[\alpha]_D^{25°\ C.}$ −149.9° (c.=1%, 1 N HCl) (first run)

$[\alpha]_D^{25°\ C.}$ −148.1° (c.=1%, 1 N HCl) (second run)

Analysis.—Calcd. for C₉H₁₁NO₃: C, 59.67; H, 6.13; N, 7.74. Found: C, 59.38; H, 6.16; N, 8.00.

(V) D-(—)-2-(p-hydroxyphenyl)-glycine.—A mixture of 1.81 g. (0.01 mole) of D-(—)-2-(p-methoxyphenyl) glycine. ($[\alpha]_D^{25°\,C.}$ —149.9° c.=1%, 1 N HCl) and 10 ml. of 48% HBr was heated at gentle reflux for 2 hours. The resulting solution was concentrated at reduced pressure at 30° C. to a wet solid. A minimum amount of water (20°C.) was added to dissolve the HBr salt and with cooling NH$_4$OH was added to pH 5. The resulting thick gel which ppt. was warmed to 50°C. and when solution was nearly obtained a different crystalline form began to ppt. Upon cooling 30 min. at 0°–5°C. there was obtained 990 mg. of cold water washed (3× 1 ml.) and air dried material, D-(—)-2-(p-hydroxyphenyl)glycine.

$[\alpha]_D^{25°\,C.}$ —161.2° (c.=1%, 1 N HCl) dec. pt. 223° c.

A second run using 20× the above amounts gave 24.5 g. of material.

$[\alpha]_D^{25°\,C.}$ —153° (c.=1%, 1 N HCl)

Analysis.—Calcd. for $C_8H_9NO_3$: C, 57.49; H, 5.43; N, 8.39. Found: C, 57.41; H, 5.67; N, 8.39.

The compounds of the present invention are useful in the treatment of infections caused by gram-positive bacteria, including particularly the resistant strains of bacteria and gram-negative bacteria, e.g. penicillin-resistant strains of *Staphylococcus aureus* (*Micrococcus pyogenes* var. *aureus*). In addition, the compounds of the present invention are orally absorbed.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three or four times a day. They are administrated in dosage units cointaining, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto.

EXAMPLE 1

D-(—)-α-(p-hydroxyphenyl)-α-(t-butoxycarbonylamino) acetic acid

To a stirred suspension of 8.35 g. (0.05 mole) of D-(—)-2-(p-hydroxyphenyl)glycine (finely ground) and 8 g. (0.2 mole) of powdered magnesium oxide in 225 ml. of 1:1 dioxane water was added 14.3 g. (0.10 mole) of t-butoxycarbonylazide (Aldrich Chemical Company Inc.) over a 30 minute period and then stirring continued for 20 hours at 45°–50° C. The resulting turbid solution was then poured into one liter of ice water with stirring. One 600 ml. ethyl acetate extract was taken and this was washed twice with 200 ml. portions of 5% sodium bicarbonate and these aqueous solutions combined and filtered. Next, with cooling, they were acidified to pH 3 with 40% phosphoric acid under a layer of 500 ml. of ethyl acetate. This ethyl acetate extract was separated and combined with two more 100 ml. ethyl acetate extracts and dried over sodium sulfate. The ethyl acetate solution was then filtered and concentrated under reduced pressure to an oil and 100 ml. of warm benzene added. The resulting solution was filtered and scratched. There was obtained 10.8 g. of crystalline material, D-(—)-α-(p-hydroxyphenyl)-α-(t-butoxycarbonylamino) acetic acid. Infrared and NMR analysis revealed only the NH$_2$ group had reacted with the azide.

Analysis.—Calcd. for $C_{13}H_{17}NO_5$: C, 58.43; H, 6.48; N, 5.25. Found: C, 62.46; H, 6.55; N, 4.56.

EXAMPLE 2

7-[D-(—)-α-(t-butoxycarbonylamino)-α-(p-hydroxyphenyl)-acetamido]cephalosporanic acid (a) To a stirred solution of 5.35 g. (0.02 mole) of D-(—)-α-(p-hydroxyphenyl)-α - (t - butoxycarbonylamino)-acetic acid, 2.02 g. (0.02 mole) of 2,6-lutidine and 50 ml. of tetrahydrofuran at —10° C. was added all at once 2.16 g. of (0.02 mole) ethyl chloroformate. After 20 minutes an ice cold solution of 5.44 g. (0.02 mole) of 7-aminocephalosporanic acid, 5 g. of sodium bicarbonate in 50 ml. of water was added, all at once with vigorous stirring. The temperature was kept at or below 0° C. for 10 minutes and between 0° C. and +10° C. for 90 minutes. Next, 100 ml. of water was added and the tetrahydrofuran removed in vacuo at 20° C. One 200 ml. ether extract was taken and discarded. The aqueous phase was layered with 200 ml. of methyl isobutyl ketone and cooled and stirred while being acidified to pH 2. The methyl isobutyl ketone layer was washed with two 100 ml. portions of water, dried briefly over sodium sulfate filtered and treated with 7 ml. (0.2 mole) of 50% NaEH (sodium 2-ethylhexonate in n-butanol). An oily precipate separated and slowly crystallized. After one hour, they were filtered off, washed with methyl isobutyl ketone and air dried. After further drying over phosphorus pentoxide (vacuum) there was obtained 5.24 g. dec. slowly above 100° C. The infrared and NMR spectra were consistent with the structure of sodium 7-[D-(—)-α-(t-butoxycarbonylamino)-α-(p-hydroxyphenyl)-acetamido]cephalosporanate.

The free acid 7-[D-(—)-α-(t-butoxycarbonylamino)-α-(p-hydroxyphenyl)-acetamido]cephalosporanic acid was obtained as an amorphous gum by extracting an acidic aqueous solution with ethyl acetate and concentrating under reduced pressure.

(b) (Alternate procedure).—To a stirred solution of 5.35 g. (0.02 mole) of D-(—)-α-(p-hydroxyphenyl)-α-(t-butoxycarbonylamino) acetic acid, 100 ml. of tetrahydrofuran, and 2.8 ml. (0.02 mole) of triethylamine at —40° C. was added dropwise 3.64 g. (0.02 mole) of trichloroacetic acid in 25 ml. of tetrahydrofuran over a 20 minute period. Next, after an additional 15 minutes; a solution of 5.44 g. (0.02 mole) of 7-aminocephalosporanic acid 5.6 ml. (0.04 mole) of triethylamine in 300 ml. of methylene chloride precooled to —40° C. was added all at once and the temperature maintained at —40° C. to —30° C. for 45 minutes. The mixture was then concentrated under the reduced pressure at 20° C. to an oil. This was taken up in 200 ml. of 2% aqueous sodium bicarbonate and 200 ml. of ether. The ether layer was discarded and the aqueous phase layered with 200 ml. of ethyl acetate and with cooling and stirring, the mixture acidified to pH 3. The ethyl acetate layer was then separated and washed twice with water, dried briefly over sodium sulfate, filtered and evaporated to an oil under reduced pressure at 20° C. Five hundred ml. of ether was then added and a small amount of insoluble material filtered off. The ether solution was then concentrated to about 200 ml. and then 200 ml. of Skellysolve B (petroleum ether) was added. The precipitate which formed was separated by filtration and consisted of the desired product, 7-[D-(—)-α-(t-butoxycarbonylamino) - α - (p - hydroxyphenyl) - acetamindo] cephalosporanic acid. Yield=6 g.

EXAMPLE 3

7-[D-(—)-α-amino-α-(p-hydroxyphenyl)-α-aminoacetamindo]cephalosporanic acid

7 - [D - (—) - α - (t - butoxycarbonylamino) - α - (p-hydroxyphenyl)-acetamido]cephalosporanic acid (6 g.) was dissolved in 100 ml. of 50% aqueous formic acid and stirred at 40° C. for 3 hours. The solution was then treated with 1 g. of decolorizing carbon and filtered. The filtrate was concentrated to a viscous oil at 20° C. under reduced pressure. The last traces of formic acid were removed by adding 300 ml. of toluene and removing same under reduced pressure at 20° C. The resulting glass was triturated with 400 ml. of ethyl acetate to which 5 ml. of water had been added. A semi-crystalline solid formed which was filtered off and vacuum dried over phosphorus pentoxide. The product, 7-[D-(—)-α-amino-α-(p-hydroxyphenyl)-acetamido]cephalosporanic acid, weighed 1.8 g. and had a decomposition point of 260° C. with darkening above 150° C. Infrared and NMR spectra were consistent with the structure.

*Analysis.*—Calcd. for $C_{18}H_{19}N_3O_7S$: C, 51.07; H, 4.55. Found: C, 51.58; H, 5.12.

This product is found to inhibit *Staphylococcus aureus* Smith at concentration of 5.0 mg./ml., *Streptococcus pyogenes* at a concentration of 0.08 mg./ml., *Staphylococcus aureus* BX–1633–2 (a strain resistant to benzylpencillin) at a concentration of 6.2 mg./ml., *Escherichia coli* Juhl at a concentration of 6.2 mg./ml., *Salmonella enteritidia* at a concentration of 6.2 mg./ml., and *Diplococcus pneumoniae* at a concentration of 2.5 mg./ml., to exhibit upon intramuscular injection in mice a $CD_{50}$ against *Staph. aureus* Smith of 0.2 mg./kg. against *Staph. aureus* BX–1633–2 of 25–36 mg./kg., against *Salmonella enteritidia* of 4 mg./kg., against *E. coli* of 10 mg./kg., and against *Diplococcus pneumoniae* of 4.5 mg./kg. and to exhibit upon oral administration in mice a $CD_{50}$ against *Diplococcus pneumoniae* of 7.0 mg./kg., against *Staph. aureus* Smith of 3.0 mg./kg., against *Staph. aureus* BX–1633–2 of 45–62 mg./kg., against *Salmonella enteritidia* of 76 mg./kg., against *Klebsiella pneumoniae* of 40 mg./kg. and against *E. coli* of 40 mg./kg.

A comparison was made of the blood levels obtained in mice upon oral administration of 7-[D-(—)-α-amino-α-(p-hydroxyphenyl)-acetamido]cephalosporanic acid with the blood levels obtained with cephaloglycine (7-[D-(—)-α-aminophenyl-acetamido]cephalosporanic acid. In the test twelve mice were dosed orally with 0.24 m. moles/kg. of each compound. The following are the average blood levels obtained:

| Time (hours) | Blood levels (mg./ml.), 7-[D-(—)-α-amino-α-(p-hydroxyphenyl)-acetamido] | |
|---|---|---|
| | Cephalosporanic acid | Cephaloglycine |
| 0.5 | 8.7 | 2.7 |
| 1.0 | 5.8 | 2.0 |
| 2.0 | 3.6 | 2.1 |
| 3.5 | 1.8 | 1.6 |

At each time the blood level obtained with 7-[D-(—)-α-amino-α-(p-hydroxyphenyl) - acetamido]cephalosporanic acid is higher than that obtained with cephaloglycine.

EXAMPLE 4

7-[D-(—)-2,2-dimethyl-4-(p-hydroxyphenyl)-5-oxo-1-imidazolidinyl]cephalosporanic acid A solution of 2.1 g. (0.005 mole) of D-(—)-7-[α-(p-hydroxyphenyl)-α-aminoacetamido]cephalosporanic acid, 0.7 ml. (0.005 mole) of triethylamine in 50 ml. of methanol was obtained by stirring for 15 minutes at room temperature (22° C.). To this was added 50 ml. of acetone and stirring continued for 5 hours. The solution was then concentrated to an oil at 20° C. under reduced pressure. Twenty-five ml. of water and 50 ml. of ethyl acetate was added and the pH adjusted to 3 with 40% $H_3PO_4$. The aqueous layer was saturated with NaCl and the mixture shaken. The ethyl acetate layer was separated and dried briefly over $Na_2SO_4$, filtered and concentrated to dryness at 20° C. under reduced pressure. The resulting solid precipitate was removed by ether trituration and filtration. After drying over $P_2O_5$ under vacuum there was obtained 310 mg. with a decomposition point of 150°–250° C. (slowly). Infrared and NMR spectra were consistent with the desired structure.

*Analysis.*—Calcd. for $C_{21}N_{23}N_3O_7S \cdot H_2O$: C, 52.61; H, 5.26. Found: C, 52.29; H, 5.48.

This product is found to inhibit *Staphylococcus aureus* Smith at a concentration of 2.5 mg./ml., *Streptococcus pyogenes* at a concentration of 0.08 mg./ml., *Staphylococcus aureus* BX–1633–2 (a strain resistant to benzylpencillin) at a concentration of 6.2 mg./ml., *Escherichia coli* Juhl at a concentration of 6.2 mg./ml., and *Diplococcus pneumoniae* at a concentration of 1.2 mg./ml., and to exhibit upon oral administration in mice a $CD_{50}$ against *Staph. aureus* Smith of 3.0 mg./kg. and against *Staph. aureus* BX–1633–2 of 70 mg./kg.

A comparison was made of the blood levels obtained in mice upon oral administration of 7-[D-(—)-2,2-dimethyl-4-(p-hydroxyphenyl)-5-oxo - 1 - imidazolidinyl]cephalosporanic acid with the blood levels obtained with cephaloglycine. In the test twelve mice were dosed orally with 0.24 m. mole/kg. of each compound. The following are the average blood levels obtained:

| Time (hours) | Blood levels (mg./ml.), 7-[D-(—)-2,2-dimethyl-4(p-hydroxy-phenyl)-5-oxo-1-imidazolidinyl]] | |
|---|---|---|
| | Cephalosporanic acid | Cephaloglycine |
| 0.5 | 3.4 | 2.7 |
| 1.0 | 3.5 | 2.0 |
| 2.0 | 2.6 | 2.1 |
| 3.5 | 1.4 | 1.6 |

At each time except 3.5 hours the blood level obtained with D-(—)-7-[2,2-dimethyl-4(p-hydroxyphenyl-5-oxo-1-imidazolidinyl)aminoacetamido]cephalosporanic acid is higher than that obtained with cephaloglycine.

EXAMPLE 5

D-(—)-α-benzyloxycarbonylamino-α-(4-hydroxyphenyl)-acetic acid

To a stirred suspension of 5.01 g. (0.03 mole) of D-(—)-2-(p-hydroxyphenyl)glycine in 100 ml. of water at 22° C. (room temperature) was added 1.2 g. (0.03 mole) of sodium hydroxide pellets. A clear solution resulted. The stirred solution was cooled to 0° C. and 2.4 g. (0.06 mole) of NaOH pellets were added. When they had dissolved 13.6 g. (0.08 mole) of carbobenzoxy chloride was added all at once with vigorous stirring. After 30 min. at 0° C. to 5° C. the pH was 7 and a few drops of 50% $NaOH$—$H_2O$ was added to keep the pH at 8–9 during another 30 min. Three hundred ml. of $H_2O$ was then added and the resulting slurry was transferred to a separatory funnel and 500 ml. of ether added. After shaking, the ether layer was discarded and the aqueous layer and solids combined with 300 ml. of ethyl acetate and the mixture acidified with shaking to pH 2 with 6 N HCl. The ethyl acetate phase was combined with two more ethyl acetate extracts and washed with two 100 ml. portions of water, two 300 ml. portions of saturated $Na_2SO_4$ solution and filtered. Upon concentrating under reduced pressure to an oil the product crystallized. The material was recrystallized from benzene-Skellysolve "B" (pet. ether) to give 8.9 g. of material with a melting point of 101°–102° C. The infrared and NMR spectra were consistent with the desired structure.

*Analysis.*—Calcd. for $C_{24}H_{21}NO_7$: C, 66.21; H, 4.88; N, 3.22. Found: C, 67.93; H, 5.24; N, 3.07.

EXAMPLE 6

7-[D-(—)-α-amino-α-(p-hydroxyphenyl)-acetamido]cephalosporanic acid

D-(—)-α-benzyloxycarbonylamino-α-(4 - hydroxyphenyl)acetic acid (0.344 mole), is dissolved in 100 mls. of dimethylformamide. There is then added 2,6-lutidine (3.7 gms.; 0.0244 mole) and the solution is cooled to 5° C. in an ice bath. Ethyl chloroformate (3.72 gms.; 0.0344 mole) is added to the cool solution over a period of five minutes. The mixture is stirred for 15 minutes and a solution of 7-aminocephalosporanic acid (0.395 mole) in 70 mls. of water and 20 mls. of 2,6-lutidine is added. The solution is stirred in the ice bath for 15 minutes, diluted with 500 mls. of water and extracted twice with ether. The ether extract is discarded. The pH of the solution is lowered to 2 by the addition of dilute $H_2SO_4$ and the product is extracted into ether. The ether extract is washed with water and the product is extracted into dilute $Na_2CO_3$. This extract has a pH of 7.5 and a volume of about 300 mls. It is then shaken with 7 gms. of 30% palladium on celite for 20 minutes under an atmosphere of hydrogen at a pressure of 50 p.s.i. The volume of the solution is doubled by the addition of water and the pH is lowered to 2 by the addition of dilute $H_2SO_4$. The catalyst is then removed by filtration and the filtrate is extracted with a mixture of 150 mls. of methyl isobutyl ketone and 8 gms. of aerosol O.T. The extract is dried over anhydrous $Na_2SO_4$ and neutralized to pH 4.5 by the addition of triethylamine and an amorphous solid is collected by filtration and slurried with 20 mls. of water. A crystalline solid is formed which is collected and dried in vacuo over $P_2O_5$. The product, 7-(D-(—)-α-amino-α-(p-hydroxyphenyl)-acetamido]cephalosporanic acid, is found to contain the β-lactam structure as shown by infrared analysis.

EXAMPLE 7

7-[D-(—)-α-amino-α-(p-hydroxyphenyl)-acetamido]-decephalosporanic acid

When in Example 2, 7-aminocephalosporanic acid is replaced by an equimolar amount of 7-aminodecephalosporanic acid there is obtained 7-[D-(—)-α-(t-butoxycarbonylamino)-α-(p-hydroxyphenyl)-acetamido] - decephalosporanic acid. Substitution in Example 3 of an equimolar amount of this compound for 7-[D-(—)-α-(t-butoxycarbonylamino) - α - (p-hydroxyphenyl) - acetamido]-cephalosporanic acid produces the product 7-[D-(—)-α-amino-α-(p - hydroxyphenyl) - acetamido] - decephalosporanic acid.

This product is found to inhibit *Staphylococcus aureus* Smith at a concentration of 0.001 percent by weight.

EXAMPLE 8

7-[D-(—)-2,2-dimethyl-4-(p-hydroxyphenyl)-5-oxo-1-imidazolidinyl-decephalosporanic acid When in Example 4, 7-[D-(—)-α-amino-a-(p-hydroxyphenyl)-acetamido]-cephalosporanic acid is replaced by an equimolar amount of 7-[D-(—)-α-amino-α-(p-hydroxyphenyl)-acetamido]-decephalosporanic acid there is obtained the product 7-[D-(—)-2,2-dimethyl-4-(p-hydroxyphenyl-5-oxo-1-imidazolidinyl] - decephalosporanic acid.

This product is found to inhibit *Staphylococcus aureus* Smith at a concentration of 0.001 percent by weight.

While this invention has been described and exemplified in terms of its preferred embodiment, those skilled in the art will appreciate that modifications can be made without departing from the spirit and scope of this invention.

I claim:
1. A compound selected from the group consisting of:
  7-[D-(—)-α-(p - hydroxyphenyl) - acetamido]cephalosporanic acid,
  7-[D-(—)-α-amino-α-(p - hydroxyphenyl) - acetamido] decephalosporanic acid,
  7-[D-(—)-2,2-dimethyl - 4 - (p-hydroxyphenyl)-5-oxo-1-imidazolidinyl]cephalosporanic acid and
  7-[D-(—)-2,2 - dimethyl - 4-(p-hydroxyphenyl)-5-oxo-1-imidazolidinyl]decephalosporanic acid and the nontoxic, pharmaceutically acceptable salts thereof.
2. The compound of claim 1 named:
  7-[D-(—) - 2,2 - dimethyl-4-(p-hydroxyphenyl)-acetamido]cephalosporanic acid.
3. A nontoxic, pharmaceutically acceptable salt of the compound of claim 2.
4. The sodium salt of the compound of claim 2.
5. The potassium salt of the compound of claim 2.
6. The triethylamine salt of the compound of claim 2.
7. The compound of claim 1 named:
  7-[D-(—)-α-amino-α-(p-hydroxyphenyl) - acetamido] decephalosporanic acid.
8. A nontoxic, pharmaceutically acecptable salt of the compound of claim 7.
9. The sodium salt of the compound of claim 7.
10. The potassium salt of the compound of claim 7.
11. The triethylamine salt of the compound of claim 7.
12. The compound of claim 1 named:
  7-[D-(—)-2,2 - dimethyl - 4-(p-hydroxyphenyl)-5-oxo-1-imidazolidinyl]cephalosporanic acid and its nontoxic, pharmaceutically acceptable salts.
13. The compound of claim 1 named:
  7-[D-(—)-2,2 - dimethyl - 4-(p-hydroxyphenyl)-5-oxo-1-imidazolidinyl]decephalosporanic acid and its nontoxic, pharmaceutically acceptable salts.

References Cited

UNITED STATES PATENTS 2,985,648   5/1961   Doyle et al. _____ 260—239.1

NICHOLAS J. RIZZO, Primary Examiner

U.S. Cl. X.R.

260—999

PO-1050
(5/69)

UNITED STATES PATENT OFFICE
CERTIFICATE OF CORRECTION

Patent No. 3,489,752     Dated January 13, 1970

Inventor(s) Leonard Bruce Crast, Jr.

It is certified that error appears in the above-identified patent and that said Letters Patent are hereby corrected as shown below:

In the claims, Claim 1. should read:

1. A compound selected from the group consisting of: 7-[D-(−)-α-amino-α-(p-hydroxyphenyl)-acetamido] cephalosporanic acid, (column 12, lines 8, 9 and 10)

SIGNED AND
SEALED
AUG 25 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,489,752        Dated January 13, 1970

Inventor(s) Leonard Bruce Crast, Jr.

It is certified that error appears in the above-identified patent and that said Letters Patent are hereby corrected as shown below:

Column 1, lines 44 and 45 should be deleted; line 48, "at" should read -- are --; line 63, -- 3-methyl- -- should be inserted before "7";

Column 2, line 1, "5" should read -- 4 --; lines 3-12 and 15-25, those parts of Formulas II and III reading 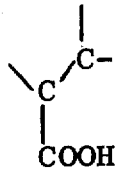 should read 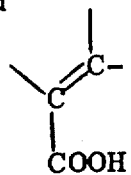 ; line 27, -- 3-methyl- -- should be inserted before "7"; line 30, "5" should read -- 4 --; lines 32-43, that part of Formula IV reading 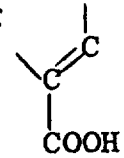 should read 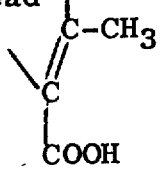 ;

Column 3, line 7, -- 3-methyl- -- should be inserted before "7"; line 69, "1967, 1955]" should read -- 1067, (1955)] --; lines 25 to 45, 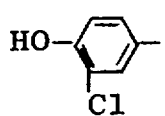 should read 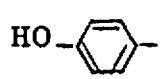 , each occurence;

UNITED STATES PATENT OFFICE
CERTIFICATE OF CORRECTION

Patent No. 3,489,752            Dated January 13, 1970

Inventor(s) Leonard Bruce Crast, Jr.       Page - 2

It is certified that error appears in the above-identified patent and that said Letters Patent are hereby corrected as shown below:

Column 4, lines 58 to 68, that part of the formula reading $O-\overset{O}{\overset{\|}{C}}CH_3$ should read R;

Column 6, that part of the formula of the first product following the arrow shown in Equation III reading $-CH-CO_2H$ should read $-\underset{NH_2}{\overset{|}{CH}}-CO_2H$; line 59, "105.4°" should read -- 150.4° --;

Column 8, lines 66 and 67, the title of Example 3 should read -- 7-[D-(-)-α-amino-α(p-hydroxyphenyl)-acetamido]-cephalosporanic acid --;

Column 11, lines 25, 29, 30, 35, 42, 47 and 49, -- 3-methyl- -- should be inserted before "7", each occurence; line 45, "a-(p-hydroxy" should read -- α-(p-hydroxy --;

Column 12, lines 11, 15, 27 and 39, -- 3-methyl- -- should be inserted before "7", each occurence.

Signed and Sealed this third Day of February 1976

[SEAL]

Attest:

RUTH C. MASON
Attesting Officer

C. MARSHALL DANN
Commissioner of Patents and Trademarks